O. A. DANIELSON.
SPEEDOMETER FOR AEROPLANES AND OTHER AERIAL DEVICES.
APPLICATION FILED JAN. 11, 1913.
1,123,253.
Patented Jan. 5, 1915.
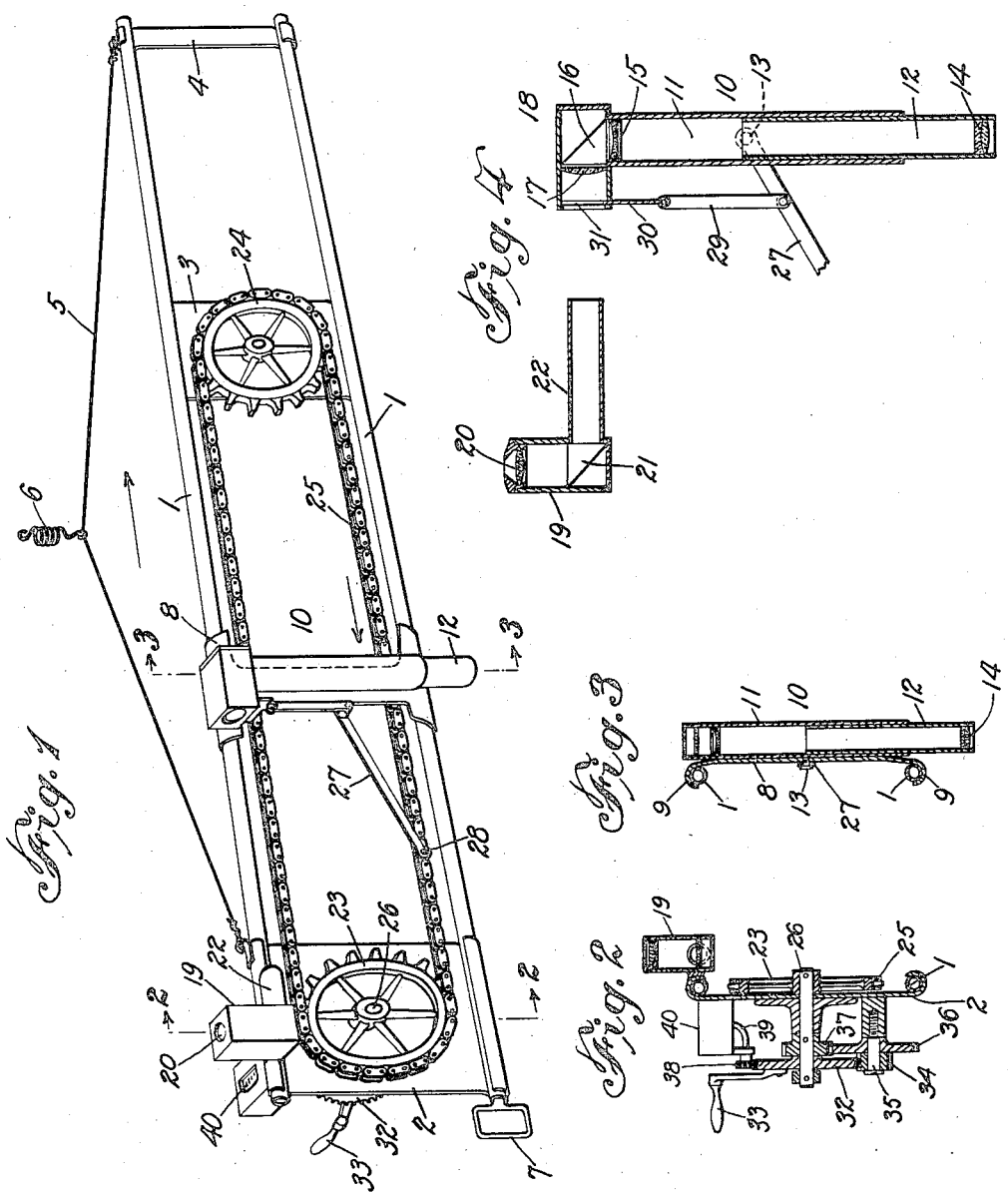
Witnesses
Frank H. Vick Jr.
L. I. Pirine.
Inventor
Oscar A. Danielson,
per Fred O. Tasker.
Atty.

UNITED STATES PATENT OFFICE.

OSCAR A. DANIELSON, OF NEW YORK, N. Y.

SPEEDOMETER FOR AEROPLANES AND OTHER AERIAL DEVICES.

1,123,253. Specification of Letters Patent. Patented Jan. 5, 1915.

Application filed January 11, 1913. Serial No. 741,380.

*To all whom it may concern:*

Be it known that I, OSCAR A. DANIELSON, a citizen of the United States, residing at New York city, in the county of New York and State of New York, have invented certain new and useful Improvements in Speedometers for Aeroplanes and other Aerial Devices, of which the following is a specification, reference being had therein to the accompanying drawing.

My present invention relates to a speedometer for an aeroplane or other aerial vehicle or device.

The object of the invention is to provide a suitable appliance for determining the speed of an aerial machine with relation to the earth, and to do this quickly and by means of a direct reading instrument, instead of by the present well-known method of taking observations and making computations therefrom, in which the altitude must be determined and used as a factor. In short, the purpose of my invention is to provide an instrument for the aeroplane which will do for it what the familiar speedometer does for an automobile, and other similar fast-moving vehicles.

In view of the fact that aeroplanes and other aerial machines are propelled through the air without contact with the earth the methods and devices now commonly employed for measuring the speed of automobiles are not available. It becomes necessary to resort to optical means; and to make observations of objects on the earth below in order to determine the speed at which these objects are being passed over by the aerial device traveling above. An aeroplane or airship of given dimensions and design with the propellers running at a given speed would travel through the air at a relative speed, which speed, having once been ascertained, could thereafter be instantly determined by a revolution counter on the propeller shaft. But it is only in calm air that the speed of an aeroplane through the air is the same as its speed with relation to the earth, and calm air is seldom experienced. Since the air is always more or less disturbed by winds, it will add its velocity to or subtract it from that of the speed of the aeroplane with relation to the earth accordingly as the aeroplane may be going in the same or the opposite direction. For example, if an aeroplane is traveling at the rate of fifty miles per hour through the air against a wind of twenty-five miles per hour, its speed with relation to the earth would be 50 minus 25, or twenty-five miles per hour; or if the aeroplane is traveling with a wind having a velocity of twenty-five miles per hour the resultant speed would be 50 plus 25 or seventy-five miles per hour. Further, if the aeroplane is not traveling directly with or directly against the wind, but at a certain angle to the direction of the wind, the resultant speed and direction with relation to the earth would be determined by the law of the parallelogram of forces.

The invention consists essentially in means for observing objects on the earth, means for causing one of the elements of the observing means to travel in the opposite direction to that of the aeroplane, thereby causing said element to stand still over the objects being observed and to cause the objects to remain stationary within the field of vision for an appreciable period of time, long enough to ascertain that they are standing still; means for determining the speed of the traveling element, which speed, when the images of the objects are stationary will be the speed of the aeroplane, and means for focusing the observed objects to convenient dimensions.

And the invention also comprises numerous details and peculiarities in the construction, arrangement and combination of parts, substantially as will be hereinafter described and claimed.

In the accompanying drawing illustrating my invention:—Figure 1 is a perspective view of my improved speedometer for aeroplanes and the like. Fig. 2 is a cross section on the line 2, 2 of Fig. 1. Fig. 3 is a cross section on the line 3, 3 of Fig. 1. Fig. 4 is a vertical section through the reflecting devices in Fig. 1 that are used for the purpose of observing objects on the earth.

Similar characters of reference designate corresponding parts throughout the different figures of the drawing.

The essential mechanical parts of my improved speedometer construction may be carried in any suitable framework, the simpler the better, and as an illustration of the same I have shown in the drawing the specimen frame consisting of a pair of parallel tubes 1, 1, preferably of steel or other metal, and similar to bicycle tubes, the same being connected together at their ends and intermediate points by plates 2, 3 and 4. This frame may be mounted in the aeroplane in any desired manner. One way of mounting involves the use of a wire 5 secured to the upper tube or rod 1 near the ends thereof, and provided with a helical spring 6 engaging the same near the center and used to suspend the apparatus from the aeroplane in such a way that it can be swung to an angle with the longitudinal axis of the aeroplane, when, owing to the direction of the wind, the line of flight with relation to the earth does not coincide with the direction of flight through the air. The spring 6 also serves as a shock-observer to prevent vibrations from the aeroplane being transmitted to the apparatus. The grip or handle 7 at one end of the frame enables the operator to swing the apparatus to the desired angle with one hand, while the other hand is employed in manipulating the crank handle which drives the chain and other parts.

8 designates a carrier which supports one of the telescopic parts employed as means for sighting objects on the earth. This carrier 8 is formed at top and bottom with curved flanges 9, which closely embrace the tubes or rods 1, 1, but slide easily thereon.

The telescope 10 consists of the tubes 11 and 12, the tube 11 being securely fastened by a bolt 13 or by any other suitable means to the carrier 8, see Fig. 3.

The tube 12 has at its lower end suitable lenses as 14, while the tube 11 has at its upper end a lens 15, prism 16 and lens 17, or some suitable reflecting mirror device so that the objects underneath the telescope 10 are reflected through the prism or mirror so as to be thrown from a vertical to a horizontal line. The mirror or prism is arranged within a casing 18 supported on the upper end of the telescope 10 and hence movable with the carrier 8 as it travels back and forth on the tubes 1 of the main frame.

On the main frame near one end thereof is an eye-piece 19 having a lense 20 and a reflecting prism or mirror 21. Said eye-piece 19 is further provided with a tube 22 secured thereto at right angles and lying in the same horizontal plane as the casing 18 within which is the prism 16. The reflecting prism 16 travels back and forth relatively to the eye-piece and its prism, but at all times the two prisms are in line with each other so that an object reflected by one will be reflected also by the other, and thus it will be seen that an observer looking downward through the eye-piece 19 will see the objects which are directly beneath the telescope 10.

The mechanism for reciprocating the telescope 10 consists essentially of sprocket wheels 23 and 24 around which passes a belt or chain 25. Sprocket wheel 23 is supported on a shaft 26 that is journaled in the vertical end part 2 of the main frame. Sprocket wheel 24 is suitably journaled for rotation in the vertical part 3 of the main frame. A connecting rod 27 is pivotally connected to the chain 25 by a screw or pin 28 and at its other end said rod 27 is suitably pivoted to the telescope carrier 8 by means of a convenient pin, as for instance the wrist pin 13. Also pivoted to the connecting rod 27 at a point near the telescope 10 is a link 29 which is pivoted to a shutter 30 working through a slot 31 in the casing 18 and designed to cover or uncover the lens 17 and reflecting prism or mirror 16. It will be obvious that as the connecting rod 27 is raised and lowered during the movements of the carrier the shutter 30 will open and close, so that while the carrier is moving in one direction the shutter will be open, and while moving in the opposite direction it will be closed.

The chain 25 which passes around the sprocket wheels 23 and 24 is actuated by the sprocket wheel 23 which has the driving function and is supported on shaft 26 as already stated.

Referring to Fig. 2, it will be seen that loose on shaft 26 is a gear wheel 32 having a crank handle 33. Gear wheel 32 engages a pinion 34 carried by a stud 35 projecting from the main frame. On stud 35 is also a gear wheel 36 which meshes with a pinion 37 fast on shaft 26. Thus the revolution of the gear wheel 32 by manipulation of the crank handle 33 will revolve the shaft 26 and drive the sprocket wheel 23 and the chain. A small pinion 38 also meshes with the drive gear 32 and actuates a flexible shaft 39 leading to the speedometer dial 40, which is of the ortinary pattern commonly used on automobiles. The observer by reading the speedometer dial 40, therefore, can easily ascertain the speed of revolution of the sprocket wheels and the chain 25.

Assuming the apparatus to be attached to an aeroplane which is traveling above the earth in the direction shown by the upper arrow, objects on the ground beneath will be reflected through the telescope by the reflecting prism 16 to the other prism 21 and thus through the eye-piece 19 where they are seen by the operator who is looking down through the lens 20. If the chain belt 25 is not running the telescope will be stationary with respect to the aeroplane, and will be moving rapidly over the ground so that the objects reflected from the ground through the telescope and mirrors to the eye-piece will appear to be sweeping rapidly across the field of vision. If, however, the crank is operated so as to cause the belt or chain 25 to travel in the direction indicated by the lower arrow, the objects reflected from the ground through the telescope and prisms will appear intermittently, that is to say, only while the shutter 30 is open, and thus while the reflecting prism 16 is on the proper side of its circuit of travel and moving in a direction opposite to the travel of the aeroplane. As the speed of the belt 25 approaches the speed of the aeroplane the objects on the earth will pass less and less swiftly across the field of vision until finally they become stationary, which will indicate that the speed of the belt or chain 25 equals the speed of the aeroplane. This speed can be instantly read on the dial of the speedometer 40.

It would seem that a simpler way of constructing my invention would be to attach the movable reflecting prism directly to the chain or belt and allow it to pass over the sprockets on its travel to and fro, thus avoiding the use of the carrier and connecting rod, but in the pratcical working of this invention it is necessary to make observations over a wide range of altitudes— from a few feet to several thousand feet— and it becomes necessary to provide an adjustable telescope to regulate the size of the image of terrestrial objects to such dimensions as will make accurate observations possible. To carry such a bulky piece of optical apparatus around sprockets or pulleys on a belt or chain is difficult, and, therefore, I have found it desirable to employ an apparatus of the simple and convenient form, which I have illustrated in the drawing.

In the operation of the device the telescope 10 will first be adjusted for the altitude for which it is being used, so as to give an image of suitable dimensions in the eye-piece 19. The operator, taking hold of the end of the loosely-supported frame by means of the handle 7, or otherwise, swings the apparatus into line with the direction of aerial flight with relation to the earth, and looking into the eye-piece turns the crank, gradually increasing the speed until the images of the objects on the earth cease to move across the field of vision and appear stationary. Of course, as already explained, it will be clearly understood that it is only during one-half of each revolution of the chain, that is to say while the carrier 8 is moving in the direction shown by the lower arrow, which is opposite to that of the direction of the movement of the aeroplane, that the shutter 30 will be open so as to permit the rays of light to pass from the object to the eye-piece. On the reverse stroke when the carrier 8 is moving in the same direction as the aeroplane the shutter 30 will be closed, shutting off all light from the reflecting prisms. When the image seen in the eye-piece becomes stationary it indicates, of course, that the carrier and the telescope are moving at the same rate of speed as the aeroplane, but in the reverse direction so that the telescope remains directly over the objects seen in the eye-piece during each stroke in the direction of the arrow, therefore the speed of the chain is the same as the speed of the aeroplane, and is promptly read on the speedometer dial.

Having thus described my invention, what I claim as new and desire to secure by Letters Patent, is:—

1. In a speedometer for aeroplanes or other aerial devices, the combination with a moving aerial body, of a device relatively movable in a direction longitudinal of the aeroplane thereon for reflecting objects on the earth.

2. In a speedometer for aeroplanes or other aerial devices, the combination with a moving aerial body, of a device relatively movable in the direction of the line of flight thereon for reflecting objects on the earth, and means for registering the speed of the latter device.

3. In a speedometer for aeroplanes or other aerial devices, the combination with a moving aerial body, of a device thereon for reflecting objects on the earth, said device being relatively movable in the direction of flight and means for imparting a variable speed to said device.

4. In a speedometer for aeroplanes or other aerial devices, the combination with a moving aerial body, of a device relatively movable in the direction of flight thereon consisting of means having the function of reflecting objects on the earth.

5. In a speedometer for aeroplanes or other aerial devices, the combination with a moving aerial body, of means thereon for reflecting earthly objects, said means being relatively movable in a direction longitudinal of the aeroplane and means for determining the speed of the latter device when the image of an object is stationary.

6. In a speedometer for aeroplanes and other aerial machines, the combination with an aerial moving vehicle or element, of means thereon for observing objects on the earth, means for imparting a relative movement to the latter means in the direction of flight, and means for measuring said movement when the reflected images of earthly objects are stationary.

7. In a speedometer for aeroplanes or other aerial devices, the combination with a moving aerial body, of means thereon for reflecting terrestrial objects, means for imparting movement to the latter means in a direction opposite to that in which the aerial body is moving, and means for indicating the speed of the observing means at a time when the reflected image of the terrestrial object is stationary.

8. In a speedometer for aeroplanes or other aerial devices, the combination with a moving aerial body, of a relatively movable device thereon for reflecting objects on the earth, a carrier for imparting motion to the reflecting means in a direction opposite to that in which the aerial body is moving, and means for indicating the speed of said carrier at a time when the reflected image is stationary.

9. In a speedometer for aeroplanes and the like, the combination with an aerial moving body, of relatively movable reflecting means whereby images of terrestrial objects can be seen, a carrier for the movable reflecting means, said carrier operating in a direction the reverse of that in which the aerial body is traveling, and means for registering the speed of the carrier.

10. In a speedometer for aeroplanes and the like, the combination with a movable aerial body, of reflecting means relatively movable in a direction longitudinal of the aeroplane, other reflecting means on the aerial body and stationary relatively thereto, means for supporting the movable reflecting means, means for imparting motion to said support, and means for registering the speed of said reflecting means.

11. In a speedometer for aeroplanes and the like, the combination of a moving aerial body, reflecting means, relatively stationary reflecting means relatively movable in a direction longitudinal of the aeroplane, a carrier for the movable reflecting means, guides for supporting and directing the motion of the carrier, means for imparting reciprocating motion to the carrier at variable speeds, means for registering the speed for the purpose of determining the speed of the aeroplane.

12. In a speedometer for aeroplanes and the like, the combination of a frame, a telescope, a carrier for said telescope, a reflecting prism for changing the angle at which an object is viewed through the telescope, wheels journaled in the frame, a belt or chain passing around said wheels and attached to the carrier, means for actuating the belt and wheels in order to reciprocate the carrier in a direction longitudinal of the aeroplane, and an eye-piece on the frame having a reflecting prism for viewing the images received through the telescope.

13. In a speedometer for aeroplanes and the like, the combination of a main frame, means for supporting it from an aeroplane or similar body, a telescopic device for viewing objects on the earth, reflecting means arranged in connection with the telescopic device for changing the angle at which the images are viewed, a carrier for the telescopic and reflecting means, and means for imparting a reciprocatory motion to said carrier in a direction longitudinal of the aeroplane, together with an eye-piece on the frame having reflecting means receiving the images transmitted by the other reflecting means from the telescope.

14. In a speedometer for aeroplanes or the like, the combination of a frame, reflecting means thereon whereby images of objects on the earth can be seen, a carrier for the reflecting means, means for reciprocating said carrier in a direction longitudinal of the aeroplane, an eye-piece on the frame through which images received by the aforesaid reflecting means can be viewed, and a register for indicating the speed of the carrier.

15. In a speedometer for aeroplanes and the like, the combination with a moving aerial body, of a device thereon relatively movable in the direction of flight for reflecting objects on the earth, a carrier for said device having an intercepting shutter sliding vertically over the reflecting means for the purpose of cutting off the light from the reflecting means while the latter is traveling in the same direction as the aeroplane, but said shutter sliding away from the reflecting means to afford free access to the light when the carrier is moving in a direction opposite to that in which the aeroplane is moving, means for imparting a reciprocating motion to the carrier, and means for connecting said shutter to said last mentioned means.

16. In a speedometer for aeroplanes and the like, the combination of a moving aerial body, relatively movable reflecting means, a carrier for the movable reflecting means, other reflecting means which are relatively stationary, wheels and a belt or chain traveling over the same, said belt being attached to the carrier, a vertically sliding shutter which passes over the movable reflecting means for intercepting the light at times and at other times affording free access to the light, a rod attached to said shutter, a second rod pivoted to the carrier and to the shutter rod and also pivotally connected with the belt or chain, so that as the latter revolves the shutter will reciprocate and the reflecting means allowed to receive the light when the carrier is moving in one direction and be cut off from the light when the carrier is moving in the opposite direction.

In testimony whereof I affix my signature in the presence of two witnesses.

OSCAR A. DANIELSON.

Witnesses:
L. S. PERRINE,
LAURA E. SMITH.